(12) United States Patent
Brooks et al.

(10) Patent No.: US 10,584,828 B2
(45) Date of Patent: Mar. 10, 2020

(54) CRYOGENIC LIQUID TANK

(71) Applicant: AeroVironment, Inc., Simi Valley, CA (US)

(72) Inventors: Alexander N. Brooks, Pasadena, CA (US); Bart D. Hibbs, Altadena, CA (US); David R. Thompson, Simi Valley, CA (US)

(73) Assignee: AeroVironment, Inc., Simi Valley, CA (US)

( * ) Notice: Subject to any disclaimer, the term of this patent is extended or adjusted under 35 U.S.C. 154(b) by 160 days.

(21) Appl. No.: 15/823,339

(22) Filed: Nov. 27, 2017

(65) Prior Publication Data
US 2018/0080606 A1 Mar. 22, 2018

Related U.S. Application Data

(63) Continuation of application No. 13/533,442, filed on Jun. 26, 2012, now Pat. No. 9,829,155, which is a (Continued)

(51) Int. Cl.
*F17C 1/12* (2006.01)

(52) U.S. Cl.
CPC ........ *F17C 1/12* (2013.01); *F17C 2201/0128* (2013.01); *F17C 2203/0325* (2013.01); (Continued)

(58) Field of Classification Search
CPC ........ F17C 2221/012; F17C 2205/0352; F17C 1/12; F17C 2227/0381; F17C 2223/0161; Y02E 60/321; Y10T 137/7761
See application file for complete search history.

(56) References Cited

U.S. PATENT DOCUMENTS 1,505,095 A * 8/1924 Heylandt .................. F17C 7/04
62/48.3
2,684,528 A 7/1954 Rossheim
(Continued)

FOREIGN PATENT DOCUMENTS

CN  1100801 A  3/1995
EP  1584859 A2  10/2005
(Continued)

OTHER PUBLICATIONS

PCT "International Search Report and Written Opinion of the International Search Authority," dated Jan. 25, 2010, of corresponding PCT application PCT/US 09/05315.
(Continued)

*Primary Examiner* — Stephen J Castellano
(74) *Attorney, Agent, or Firm* — Eric J. Aagaard, Esq.; The Law Office of John A. Griecci

(57) ABSTRACT

A hydrogen storage tank for a hydrogen fueled aircraft. The tank has a wall made of layers of aerogel sections around a hard shell layer, sealed within a flexible outer layer, and having the air removed to form a vacuum. The periphery of each layer section abuts other sections of that layer, but only overlies the periphery of the sections of other layers at individual points. The wall is characterized by a thermal conductivity that is lower near its gravitational top than its gravitational bottom. The tank has two exit passageways, one being direct, and the other passing through a vapor shield that extends through the wall between two layers of aerogel. A control system controls the relative flow through the two passages to regulate the boil-off rate of the tank.

5 Claims, 8 Drawing Sheets

Related U.S. Application Data continuation of application No. 12/586,544, filed on Sep. 23, 2009, now Pat. No. 8,960,482.

(60) Provisional application No. 61/194,054, filed on Sep. 23, 2008.

(52) U.S. Cl.
CPC ............ *F17C 2203/0329* (2013.01); *F17C 2203/0358* (2013.01); *F17C 2203/0391* (2013.01); *F17C 2203/0395* (2013.01); *F17C 2203/0604* (2013.01); *F17C 2203/0629* (2013.01); *F17C 2203/0643* (2013.01); *F17C 2203/0646* (2013.01); *F17C 2203/0673* (2013.01); *F17C 2205/0314* (2013.01); *F17C 2205/0332* (2013.01); *F17C 2205/0352* (2013.01); *F17C 2209/22* (2013.01); *F17C 2209/221* (2013.01); *F17C 2209/227* (2013.01); *F17C 2209/238* (2013.01); *F17C 2221/012* (2013.01); *F17C 2223/0161* (2013.01); *F17C 2223/033* (2013.01); *F17C 2223/047* (2013.01); *F17C 2227/0304* (2013.01); *F17C 2227/0306* (2013.01); *F17C 2227/0381* (2013.01); *F17C 2250/043* (2013.01); *F17C 2250/0408* (2013.01); *F17C 2250/0636* (2013.01); *F17C 2260/012* (2013.01); *F17C 2260/033* (2013.01); *F17C 2265/034* (2013.01); *F17C 2270/0189* (2013.01); *Y02E 60/321* (2013.01); *Y10T 29/49* (2015.01); *Y10T 29/49826* (2015.01); *Y10T 137/0318* (2015.04)

(56) References Cited

U.S. PATENT DOCUMENTS

| | | | |
|---|---|---|---|
| 3,009,601 A | 11/1961 | Matsch | |
| 3,147,878 A | 9/1964 | Wissmiller | |
| 3,273,740 A | 9/1966 | Herrenschmidt | |
| 3,341,052 A | 9/1967 | Barthel | |
| 3,392,865 A | 7/1968 | Shriver | |
| 3,535,179 A | 10/1970 | Shriver | |
| 3,540,615 A | 11/1970 | Paine et al. | |
| 3,583,592 A | 6/1971 | Kerfman | |
| 3,612,334 A * | 10/1971 | Gardner | B65D 7/22 220/560.1 |
| 3,695,050 A | 10/1972 | Bancroft | |
| 3,707,850 A | 1/1973 | Connell et al. | |
| 3,782,128 A | 1/1974 | Hampton et al. | |
| 3,882,809 A | 5/1975 | Johnson et al. | |
| 3,921,555 A | 11/1975 | Suzuki et al. | |
| 3,948,406 A | 4/1976 | Papanicolaou et al. | |
| 3,987,925 A | 10/1976 | Sattelberg | |
| 3,993,213 A | 11/1976 | Burge et al. | |
| 4,145,892 A | 3/1979 | Skakunov et al. | |
| 4,154,363 A | 5/1979 | Barthel | |
| 4,170,952 A | 10/1979 | McCown | |
| 4,272,257 A | 6/1981 | Ellion et al. | |
| 4,366,917 A | 1/1983 | Kotcharian | |
| 4,394,929 A | 7/1983 | Patel et al. | |
| 4,399,831 A | 8/1983 | Robert | |
| 4,835,975 A | 6/1989 | Windecker | |
| 5,271,980 A | 12/1993 | Bell | |
| 5,279,323 A | 1/1994 | Grove et al. | |
| 5,368,184 A | 11/1994 | Fay et al. | |
| 5,386,706 A | 2/1995 | Bergsten et al. | |
| 5,398,515 A | 3/1995 | Lak | |
| 5,501,359 A | 3/1996 | Chauvin et al. | |
| 5,613,366 A | 3/1997 | Schoenman | |
| 5,797,513 A | 8/1998 | Olinger et al. | |
| 5,901,557 A | 5/1999 | Grayson | |
| 5,916,097 A | 6/1999 | Markuten | |
| 5,956,957 A | 9/1999 | Lowry et al. | |
| 6,374,618 B1 | 4/2002 | Lak | |
| 3,134,237 A1 | 2/2003 | Canty et al. | |
| 6,521,077 B1 | 2/2003 | McGivern et al. | |
| 6,591,617 B2 | 7/2003 | Wolfe | |
| 6,634,519 B2 | 10/2003 | Pelloux-Gervais et al. | |
| 6,997,458 B1 | 2/2006 | Yokomi | |
| 7,052,047 B1 | 5/2006 | Box et al. | |
| 7,226,243 B2 | 6/2007 | Lee et al. | |
| 7,278,278 B2 | 10/2007 | Vvowk et al. | |
| 8,043,396 B2 | 10/2011 | Pessana | |
| 8,202,357 B2 | 6/2012 | Behruzi et al. | |
| 2003/0029877 A1 | 2/2003 | Mathur et al. | |
| 2007/0264485 A1 | 11/2007 | Stepanian et al. | |
| 2008/0006743 A1 | 1/2008 | Miller et al. | |
| 2008/0307798 A1 | 12/2008 | Luo | |
| 2011/0168159 A1 | 7/2011 | Lataperez et al. | |
| 2012/0146992 A1 | 6/2012 | Maeta et al. | |
| 2012/0279971 A1 | 11/2012 | Brooks et al. | |

FOREIGN PATENT DOCUMENTS

| | | |
|---|---|---|
| JP | 52-47775 A | 10/1977 |
| JP | 58-104500 U1 | 7/1983 |
| JP | 07-19400 U1 | 1/1995 |
| WO | WO 2006/130019 A1 | 12/2006 |

OTHER PUBLICATIONS

PCT "Invitation to Pay Additional Fees," Nov. 9, 2009, of corresponding PCT application PCT/US 09/05315.

"Search Report and Written Opinion," dated Oct. 3, 2012, performed by serv.ip, a company of the Austrian Patent Office, for a corresponding Singapore National Stage Application 201102416-3, and dated Nov. 19, 2012, by the Intellectual Property Office of Singapore (IPOS).

"Supplementary Search Report," dated Jul. 16, 2013, performed by serv.ip, a company of the Austrian Patent Office, for a corresponding Singapore National Stage Application 201102416-3 (claims 9-20), and dated Aug. 19, 2013. by the Intellectual Property Office of Singapore (IPOS).

"Supplementary Search Report,"dated Aug. 9, 2013, performed by serv.ip, a company of the Austrian Patent Office, for a corresponding Singapore National Stage Application 201102416-3 (claims 21-26), and dated Oct. 2, 2013, by the Intellectual Property Office of Singapore (IPOS).

"Supplementary Search Report," dated Aug. 9, 2013, performed by serv.ip, a company of the Austrian Patent Office, for a corresponding Singapore National Stage Application 201102416-3 (claim 27), and dated Oct. 2, 2013, by the Intellectual Property Office of Singapore (IPOS).

"First Office Action" from the State Intellectual Property Office of PRC, dated Mar. 8, 2013, including an English translation thereof, for corresponding China National Stage Application No. 200980146321.X.

"Notification of Reasons for Rejections," from the Japanese Patent Office (JPO), dated Sep. 4, 2013, including an English translation thereof, for a corresponding Japan National Stage Application No. 2011-527839.

* cited by examiner

CRYOGENIC LIQUID TANK

This application is a Continuation Application of U.S. application Ser. No. 13/533,442, filed Jun. 26, 2012, now U.S. Pat. No. 9,829,253, which is a Continuation Application of U.S. application Ser. No. 12/586,544, filed Sep. 23, 2009, now U.S. Pat. No. 8,960,482, which claims the benefit of U.S. Provisional Application No. 61/194,054, filed Sep. 23, 2008, each of which is incorporated herein by reference for all purposes.

The present invention relates generally to a cryogenic fluid tank and, more particularly, to methods and apparatus that provide for lightweight containment of liquid hydrogen and are suitable for long-duration aircraft.

BACKGROUND OF THE INVENTION

Hydrogen is an attractive fuel for high-altitude, long-duration aircraft because it contains about 2.8 times the energy per pound as compared with traditional hydrocarbon fuels. In aircraft applications requiring very long-range or endurance, the high specific energy of hydrogen may be a key enabler. However, practical considerations have largely prevented its use. While the specific energy of hydrogen is very high, the energy per unit volume is comparatively low.

In order to take advantage of the high specific energy of hydrogen, the associated tanks are preferably light weight—ideally being just a small fraction of the weight of the stored hydrogen (and preferably on the order of 10% to 25%). Typical tanks for storing compressed gaseous hydrogen have a weight of about 10 to 20 times that of the hydrogen stored, and are not likely practical for high-altitude, long-duration aircraft. Liquid hydrogen tanks for large rocket boosters have weights in the range of 10% of the hydrogen carried. However, these tanks are not intended for extended-duration storage (such as 1-2 weeks). They also benefit from the large-scale of the tanks, which is impractical for typical embodiments of a high-altitude, long-duration aircraft.

Liquid hydrogen powered high-altitude long-endurance aircraft will typically require tanks with sufficient insulation to prevent complete boil-off for one to two weeks. An anticipated capacity of an individual tank might range from 100 to 2000 pounds of liquid hydrogen, depending on the configuration and size of the airplane.

Smaller liquid hydrogen tanks have been demonstrated for some automotive applications. A very low heat leak rate is required for automotive uses, as vehicles are often stationary without any fuel being used, and it is desired that hydrogen not escape from the vehicle's tank over several days of inactivity. These tanks are typically very heavy (e.g., one system that stores 10 pounds of liquid hydrogen may weigh 200 pounds). Automotive safety standards also dictate a level of structural crash worthiness that would not typically be needed for a manned or unmanned aircraft.

The method of insulating a tank must deal with several types of heat transfer: conduction through solids, conduction and convention through gas, and radiation. Most methods of effecting high-performance insulation rely on a vacuum to nearly eliminate the conduction and convection gas heat transfer. Solid conduction is reduced by having the insulated tanks supported in the vacuum by structural supports of high-strength to conductivity ratio (e.g., stainless steel, glass fiber, or Dacron fiber). Radiant heat transfer is minimized by radiation shields (such as multi-layered insulation or opacified powders) and/or by polished highly reflective surfaces on the inner and outer walls of the vacuum chamber, as described in U.S. Pat. No. 6,347,719.

Accordingly, there has existed a need for an aircraft cryogenic storage tank that can provide for long-duration storage, and be characterized by a low weight. Moreover, this tank needs to operate in conjunction with other aircraft systems to provide cryogenic fuel at rates that meet fuel requirements, and using systems that maximize the overall efficiency of the aircraft. Preferred embodiments of the present invention satisfy these and other needs, and provide further related advantages.

SUMMARY OF THE INVENTION

In various embodiments, the present invention solves some or all of the needs mentioned above, offering a cryogenic storage tank that provides a high level of energy storage per volume, has ability to contain the fluids for extended periods of time, is flexible in its usage, and is extremely lightweight with respect to the weight of liquid that may be contained.

The invention is characterized by a tank wall configured to store a cryogenic fluid in liquid form within a fluid storage space. In a first aspect, the tank is characterized by a gravitational bottom and a gravitational top, and the wall that defines and substantially surrounds the fluid storage space is characterized by a thermal conductivity that is different near the gravitational top from what it is near the gravitational bottom.

Advantageously, this feature allows a tank designer to change (e.g., reduce) the differences between the burn-off rates of the tank at various levels of fill. This feature takes into account the fact that the burn-off rate is primarily related to the surface area of the tank that is actually in contact with cryogenic liquid (as opposed to the surface area in contact with the fluid in vapor form).

In a second aspect, the tank includes a wall forming a hard outer layer, a flexible outer layer, and one or more intermediate layers being made from a plurality of sections, each of these sections having a lateral periphery that laterally abuts the lateral periphery of one or more of the other sections to extend laterally throughout the wall. The sections are configured such that the wall is characterized by having no laterally extending portion completely over which every intermediate layer has an extending periphery to create a laterally extending insulation gap.

An advantage of this configuration is that an aerogel insulator portion of the wall, which is a large and typically curved structure, can be constructed in manageable pieces and then assembled. Moreover, for a given tank design, the thermal conductivity of any given portion of the wall can be changed by changing only those pieces that cover that wall portion. Thus, each manufactured tank can be customized to a specific variation in thermal conductivity, based on the anticipated use of the tank, by only changing out the portions of the tank insulation that are different from a baseline design.

In a third aspect, around an inner-most layer that defines and substantially surrounds a fluid storage space, is a first set of one or more tubes extending from within the fluid storage space to outside of the fluid storage space and forms passageways creating a vapor shield. A second set of one or more tubes is adapted as a passageway extending from within the fluid storage space to outside of the fluid storage space without being configured to serve as a vapor shield. A switching device is configured to control the relative flow rates from the first and second sets of tubes so as to control the activity level of the vapor shield. Using this aspect of the invention provides for active regulation of the burn-off rate of the tank without typically having to sacrifice power to drive a heater within the tank, and allows for the tank to be structurally thinner and lighter by replacing some thermal insulation with an actively controlled vapor shield.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Figure 1:
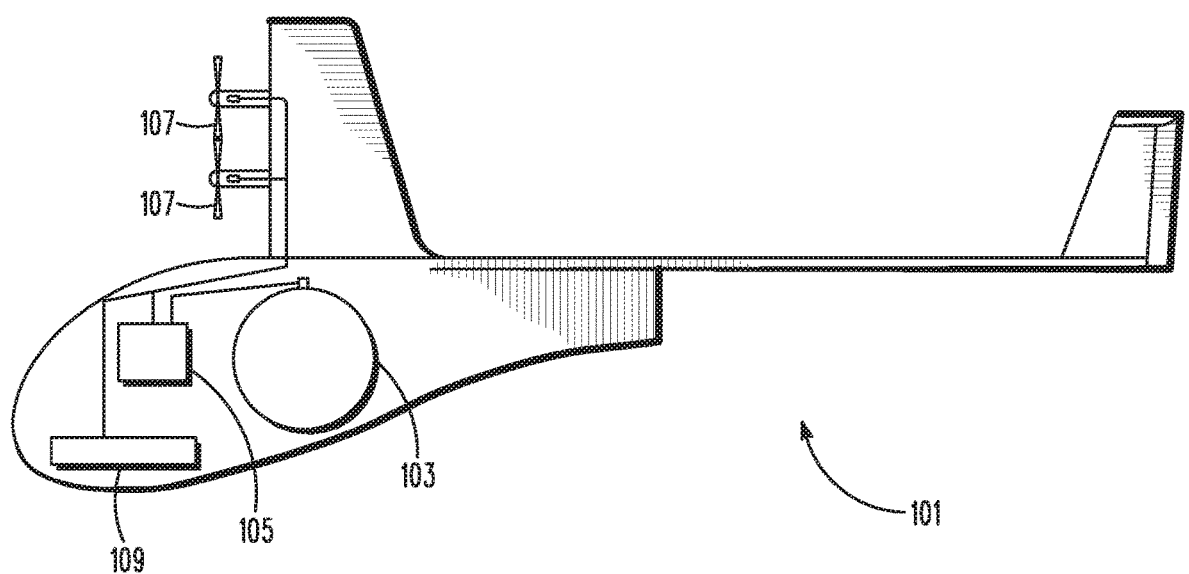
FIG. 1 is an elevation view of an aircraft including a tank embodying the present invention.

With reference to FIG. 1, typical embodiments of the present invention reside in a liquid hydrogen tank for a high-altitude long-endurance aircraft. The embodiment is well suited for use by an unmanned long-duration aircraft 101 that is configured to fly in the stratosphere. The aircraft includes one or more tanks 103 to carry hydrogen fuel. Hydrogen gas that boils off from the tank is piped to a power converter 105 (which is typically a fuel cell or internal combustion engine). The power converter either burns the hydrogen in an engine to produce shaft power to turn one or more propellers 107 and/or to make electricity to power a payload 109, or reacts the hydrogen with oxygen from the air in a fuel cell to produce electricity. This electricity is then used to power propulsion motors and the payload.

The tank is characterized by several unique aspects, each of which can be used individually, or in combination with one more of the other aspects. It is constructed as a wall substantially surrounding a fluid storage space, and having an inner, hard shell forming the fluid storage space, and an outer insulator. The outer insulator is formed from several layers of an aerogel that are encased between an airtight, flexible cover and the hard shell. The air is drawn out to form a vacuum between the hard shell and the flexible airtight cover.

Each layer is made of a plurality of sections that fit together like a puzzle to substantially surround the hard shell and the fluid storage space, such that the layer extends laterally throughout the wall. The sections have lateral periphery that define edges, and the edges of each layer only overlap the edges of other layers at single points around the wall of the tank. For this application, the term lateral is to be understood to mean a direction parallel to the local surface of the hard shell at the circumferential location being considered.

As the aircraft uses the hydrogen fuel, the liquid level in the tank is reduced, thereby reducing the effective direct heat transfer area between the hard shell and the liquid hydrogen. The insulation is tailored such that the majority of the heat passage is nearer to the bottom of the tank, thus slowing the effect of the changing effective direct heat transfer area.

The insulation further includes a vapor shield, i.e., a series of tubes surrounding the tank, and that connect the interior of the tank to an external feed line outside the tank. Another series of tubes is a direct exit that connects the tank to the external feed line without forming a vapor shield. Liquid from the tank is evaporated and drawn from the tank, and can optionally be drawn through the vapor shield lines to absorb external heat, and thereby reduce heat flow into the tank. Alternatively, liquid can be withdrawn from the tank through the other, direct-exit passageway, which causes no reduction in heat flow to the tank to occur via the effect of a vapor shield. A valve is used to control the passageways through which the liquid flows. By managing the relative flow rate through the vapor shield and the direct-exit passageway, heat flow into the tank can be actively regulated, thereby reducing the need to use electrical current or other means to introduce heat into the tank, and thereby regulating the gasification of the liquid.

Layered Aerogel

Figure 2:
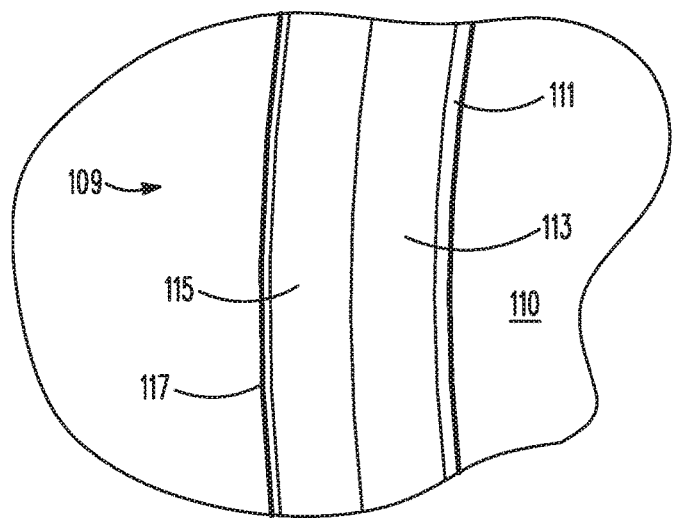
FIG. 2 is a cross-sectional view of a portion of a wall of the tank depicted in FIG. 1.

More particularly, with reference to FIG. 2, a liquid storage tank under a first embodiment of the invention forms a wall 109 that defines and substantially surrounds a fluid storage space, i.e., an inner tank 110. The structural portion of the wall includes a hard shell 111, a vacuum barrier film 117, and one or more intermediate insulation layers between the hard shell and the vacuum barrier film. The insulation layer(s) are in a vacuum, provide insulation, and support the external pressure loads due to the vacuum. More particularly, there is a first, intermediate aerogel insulation layer 113, and a second intermediate aerogel insulation layer 115. In this embodiment, the hard shell directly delimits the fluid storage space, and is of a material and construction suitable for containing the liquid hydrogen against permeation. Its load carrying capability is designed to carry an internal design pressure (which might typically be in the range of 20 to 80 psi).

In the context of discussing this embodiment, both the hard shell 111 and the vacuum barrier film 117 may be thought of as outer layers with reference to the construction of the wall, even through the shell forms an inner face of the wall with respect to the overall construction of the tank. Thus, with reference to the wall, the hard shell is a hard outer layer and the vacuum barrier film is a flexible outer layer, while the insulation layers are inner layers.

Figure 3:
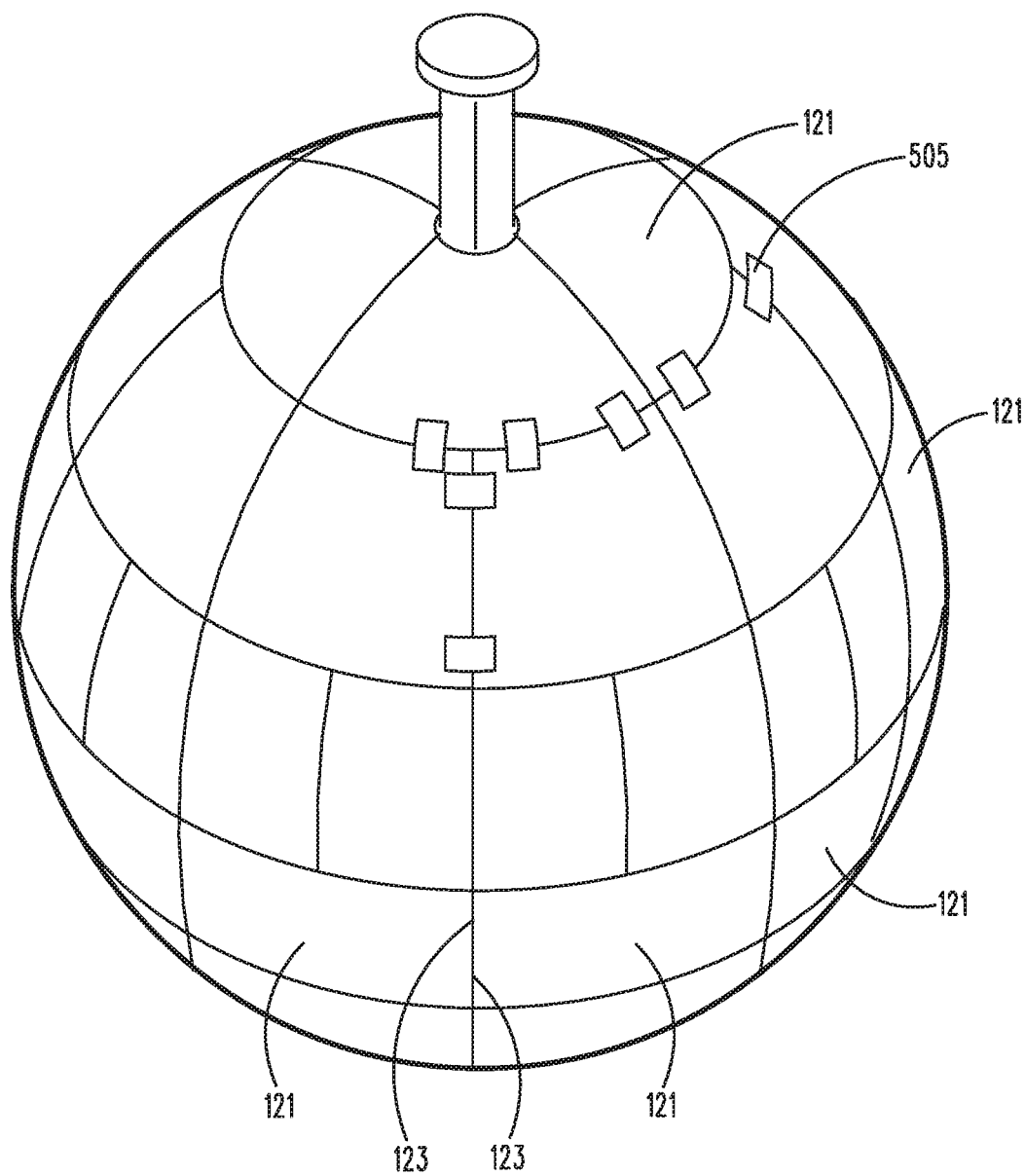
FIG. 3 is a perspective view of the first aerogel layer surrounding a hard shell and a neck, as incorporated into the tank depicted in FIG. 1.
Figure 10:
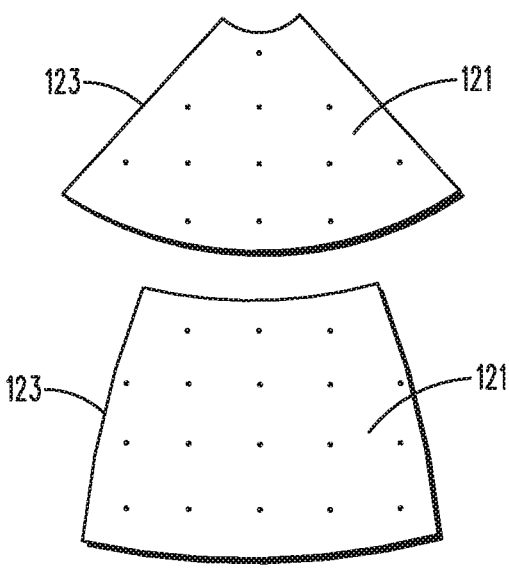
FIG. 10 is a cross-sectional view of an individual section of one of the aerogel layers depicted in FIG. 4.
Figure 10:
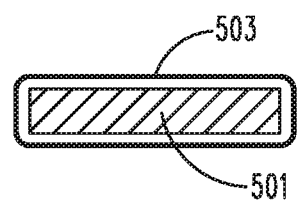
Figure 4:
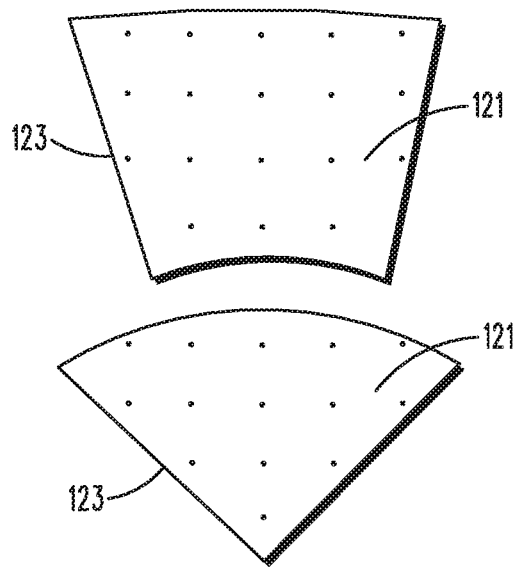
FIG. 4 is a view of five individual sections used in forming the aerogel layer depicted in FIG. 3.

With reference to FIGS. 2-4, each intermediate aerogel insulation layer 113 & 115 between the hard shell 111 and the vacuum barrier film 117, is made of a plurality of sections 121, e.g., the first layer 113 is made from first-layer sections, and the second layer 115 is made from second-layer sections. For each layer, each section is characterized by a lateral periphery 123 that laterally abuts the lateral periphery of one or more of the other sections of that layer, such that the sections fit together in a puzzle-like fashion throughout the wall to surround and cover substantially the entire hard shell 111.

The sections of the first and second layers have different configurations, such that for every first-layer section, no portion of the periphery of that first-layer section both extends parallel to and radially overlaps a portion of the periphery of any second layer section. Thus, the two layers form an insulation layer that has at most single-point locations (rather than laterally extending lines) over which there is no aerogel, and the wall is characterized by having no laterally extending portion completely over which every intermediate layer has an extending periphery such that there is a radial gap in the wall insulation that extends over a distance to create a laterally extending insulation gap.

In an alternative embodiment having three or more complete intermediate aerogel layers (i.e., insulation layers substantially surrounding the hard shell), two layers could have laterally extending portions completely over which they both have an extending periphery, so long as the additional one or more layers overlay the laterally extending portions such that there are at most only single-point locations over which there is no aerogel. In another alternative embodiment, more complex aerogel shapes could be formed as combinations of attached or integrated first and second layer pieces from the described embodiment. As with the earlier described alternatives, the wall of this embodiment is characterized in that there is no laterally extending portion completely over which every intermediate layer has an extending periphery such that there is a radial gap in the wall insulation that extends over a distance.

The flexible vacuum barrier film layer is in the form of a bag that surrounds the intermediate layers of insulation. The hard and flexible tank layers are sealed to one another to form an airtight compartment containing the insulation layers, and air is drawn from the airtight compartment to substantially form a vacuum. The vacuum is close enough to a perfect vacuum to serve as a good insulator for a cryogenic liquid, as is known in the art.

In this embodiment, the flexible layer is an outer layer on an external side of the wall, and the hard shell is a relatively rigid (i.e., load carrying) layer is on an internal side of the wall. Other configurations are within the scope of the invention.

Figure 5:
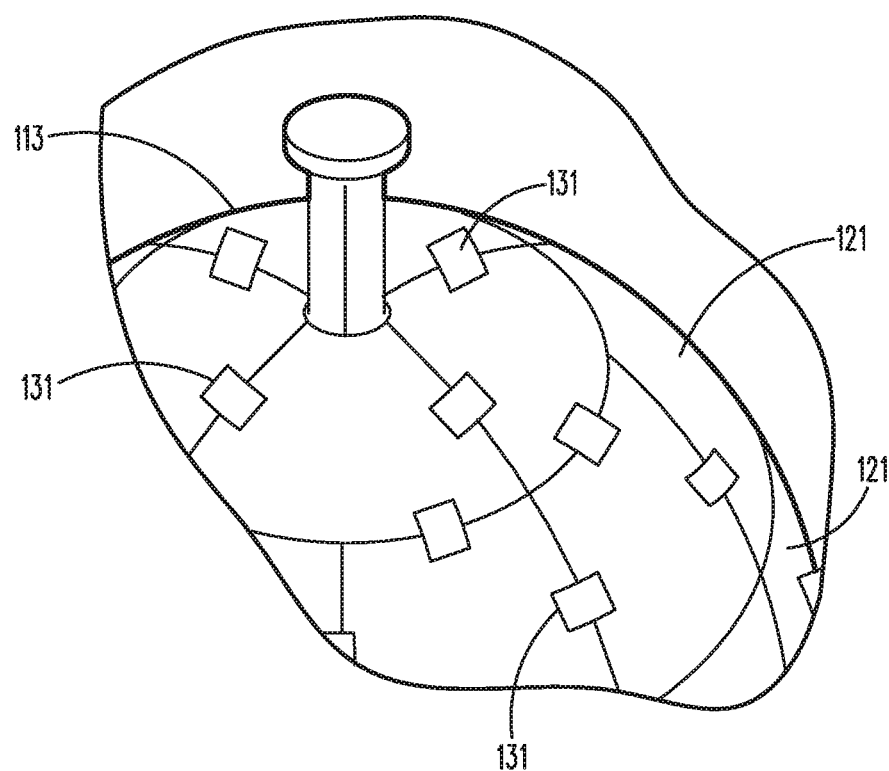
FIG. 5 is a portion of a perspective view of the first aerogel layer depicted in FIG. 3, with a further depiction of individual sections.

With reference to FIG. 5, in addition to the first intermediate layer aerogel insulation sections 121, individual sections 131 that are not part of a layer, and which might be thinner than the layer sections, are used to prevent heat leakage through any single-point locations over which every intermediate layer has an extending periphery such that there is a linear, radial gap in the wall insulation. The second intermediate layer, which is not shown in this figure, has periphery that overlies the periphery of the first intermediate layer at the points of the individual sections.

In this embodiment, the individual sections 131 form small patches over the single-point locations, and have lateral periphery that do not laterally abut the lateral periphery of any other individual sections. They are located between the first and second layers 113 & 115, but in other embodiment they may be between the first layer and the hard shell 111, or between the second layer and the vacuum barrier film 117.

Varied Insulation Effectiveness

When the tank is in use, heat will primarily conduct into the tank through a portion of the tank wall that is in direct contact with cryogenic fluid, rather than through portions of the tank containing the fluid as a vapor. As a result, with all ambient factors held constant, the boil-off rate will decline as the surface area associated with the present fluid level in the tank goes down. For a stratospheric aircraft, this is not necessarily counterproductive, as the aircraft will typically need less fuel to remain in flight as the tank, and thus the aircraft, weighs less. Nevertheless, for any given aircraft, the anticipated average flight scenario might be characterized by too little or too much boil-off near the end when the boil-off rate changes only by the fuel-level surface area, as described above.

When there is too little boil-off in the tank, some type of heater such as an electric heater may be used to increase the boil-off rate. This provides for adequate fuel flow, but expends energy that could otherwise be used to extend the flight duration of the aircraft. When there is too much boil-off, either the excess fuel must be dumped, or an additional cooling mechanism must be used to slow the boil-off rate. Either case causes inefficiencies that limit flight duration. The present invention limits these inefficiencies by tailoring the naturally occurring boil-off rate occurring over the ambient conditions for the average anticipated flight. The boil-off rate is tailored by tailoring the thermal conductivity over the wall of the tank such that greater passive control of the boil-off rate is achieved based on the liquid-level surface area of the tank.

Figure 6:
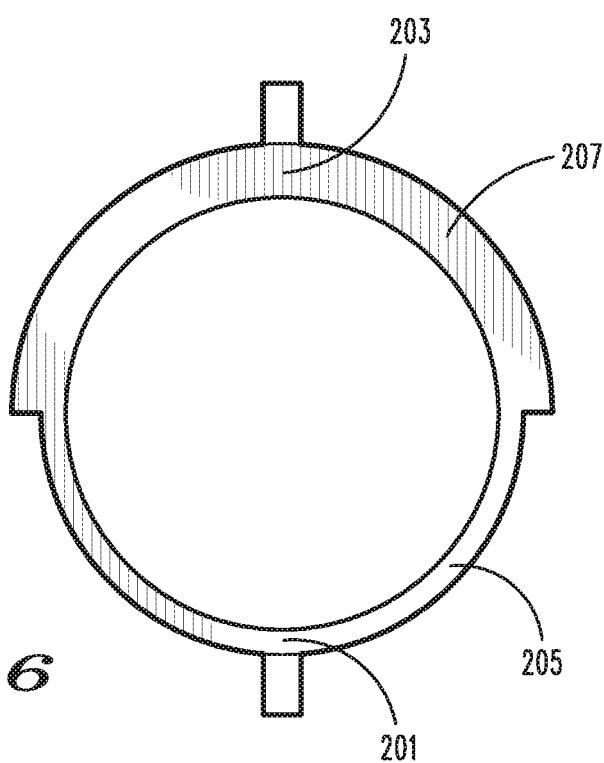
FIG. 6 is a cross-sectional view of the tank depicted in FIG. 1, showing the thickness of the wall of the tank.

With reference to FIGS. 1, 2 and 6, within the aircraft 101, the tank 103 is oriented such that it is characterized by a gravitational bottom 201 and a gravitational top 203. The wall that defines and substantially surrounds a fluid storage space, i.e., the inner tank 110, is characterized by a thermal conductivity that is lower at and near the gravitational top than it is at and near the gravitational bottom. It should be understood that this description explicitly refers to the conductivity of the wall itself, which is distinct from the thermal conductivity of any connective hardware (e.g., a neck) that may be present at the gravitational top and/or bottom.

In this embodiment, the wall comprises a plurality of portions including a bottom portion 205 that contains and includes the gravitational bottom 201, and a top portion 207 that contains and includes the gravitational top 203. Throughout each portion of the plurality of portions, the wall is characterized by a constant thermal conductivity. The thermal conductivity of the top portion is lower than the thermal conductivity of the bottom portion, i.e., the top portion is a better insulator than the bottom portion. In the depicted embodiment, there are two portions of the wall, the top wall portion being constructed of aerogel layers that are thicker than the aerogel layers of the bottom wall portion.

As a result, of the greater insulation near the top, the majority of heat flux occurs through the bottom, and the boil-off rate varies less than it otherwise would as the liquid level goes down through the top portion of the tank.

In an alternative embodiment, the thermal conductivity varies continuously from the gravitational top to the gravitational bottom, or in a fashion tailors the desired heat flux for each liquid level through which the liquid will pass. This tailoring can be done through variations in insulator thickness, or variations in thermal conductivity, such as by using more than one type or density of insulator. Further tailoring may be done by varying the conductivity around the latitudinal circumference of the tank at any given fluid level, as well as by varying the conductivity by fluid level. This could help compensate for the fact that the surface area of a latitudinal strip around the equator of the tank (which divides the gravitational top half from the gravitational bottom half) is large compared to the surface area of a latitudinal strip of equal width taken from higher or lower latitudes in the tank.

The variation in thermal conductivity of this aspect could be accomplished by using an insulator structure that is less conductive at one latitudinal end of the tank (e.g., the top) than the other. For example, in the above embodiment, the individual sections 131 of aerogel covering the single-point overlaps in section peripheries 123 could be varied over the height of the individual section in the tank (i.e., the nearness to the gravitational top). For example, the individual sections could be thicker near the top of the tank than they are near the bottom, or they could be laterally larger near the top of the tank, or they could even be left off of the tank at locations near the bottom. It should be noted that the last option might provide some structural risks, as the vacuum barrier film 117 is supported against the vacuum by the various aerogel sections, and only the individual sections 131 provide that support at the single-point overlapping section peripheries of the different levels.

Vapor Shield

Figure 7:
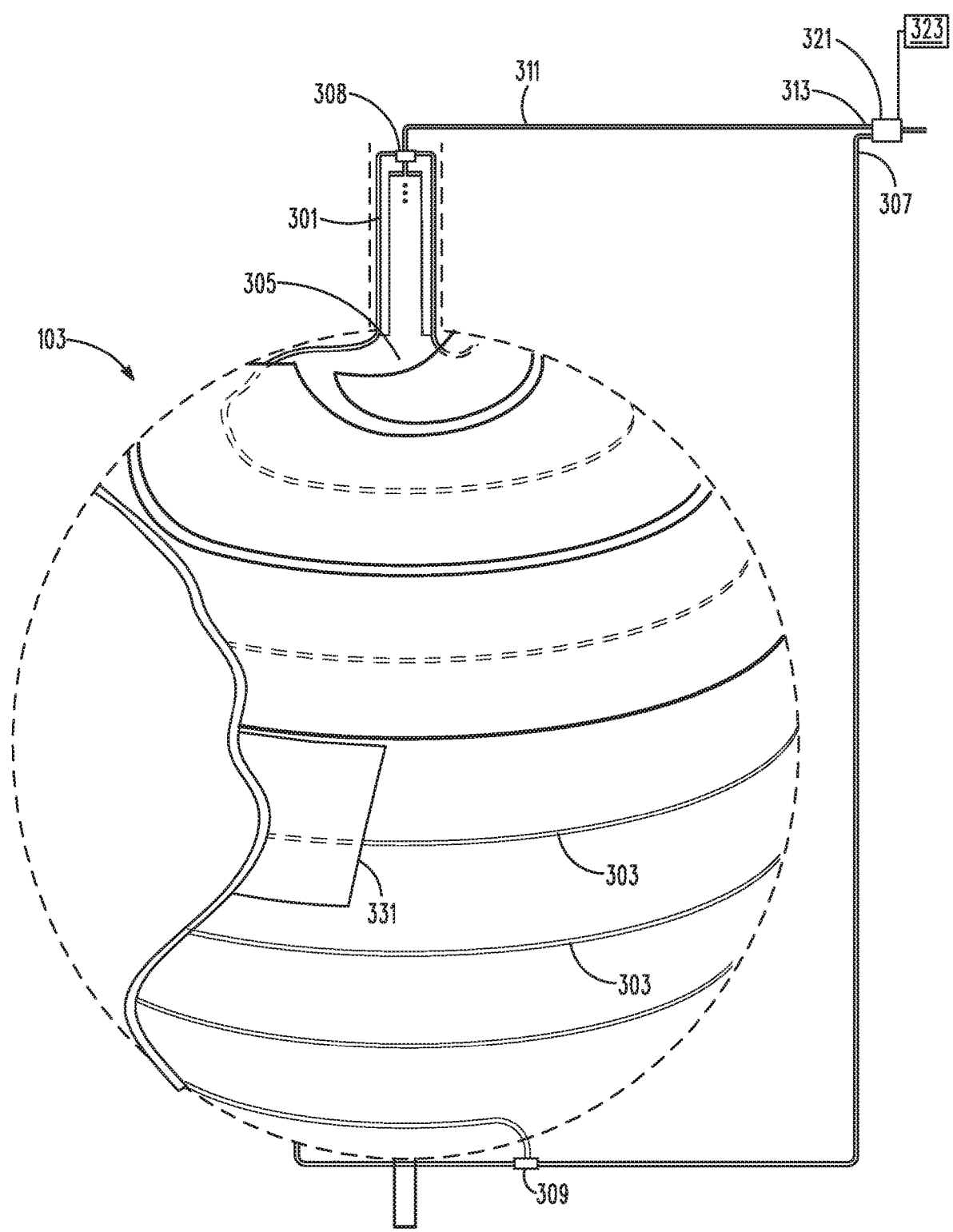
FIG. 7 is a depiction of a vapor shield incorporated into the tank depicted in FIG. 1.

With reference to FIGS. 2 & 7, the tank 103 is further configured with a vapor shield to better insulate the fluid storage space for containing a cryogenic liquid from the ambient conditions in which the tank resides. The fluid storage space is defined as the inner tank 110. The vapor shield extends around at least a portion of the hard shell 111, which forms an inner-most layer that defines and substantially surrounds the fluid storage space.

The vapor shield includes a first set of one or more tubes 301 configured to extend around the outside of the inner-most layer (e.g., the hard shell 111), and being adapted to form surrounding passageways for cryogenic vapor (from the cryogenic liquid) to be used as a vapor shield around at least a portion of the inner-most layer. This first set of tubes extend from an entrance within a gravitational upper end 305 of the fluid storage space, to a tube portion 303 forming the surrounding passageways, and finally to an exit 307 outside of the fluid storage space. The tube portion 303 that forms the surrounding passageways is preferably lightweight, with good thermal conductivity. A suitable material for the tube portion 303 is aluminum. In the depicted embodiment, two surrounding passageways are formed from the first set of one or more tubes. The two passageways separate at a top manifold 308, and rejoin at a bottom manifold 309.

A second set of one or more tubes 311 are adapted as a second passageway extending from an entrance within the gravitational upper end 305 of the fluid storage space to an exit 313 outside of the fluid storage space, but are configured without a portion forming surrounding passageways adapted to serve as a vapor shield for the tank. Both the first and second sets of tubes are adapted to fully provide the vaporized liquid (fuel) from the tank as needed for use by the aircraft. Optionally, the first and second sets of tubes may be unitary from their entrances to the top manifold 308.

The vapor shield is configured with a switching device 321 configured to control and regulate the relative flow rates from the exits 307, 313 of the first and second passageways, such that the aircraft can controllably draw vapor from either source. A control system 323 controls the switching device to control the boil-off rate of the tank based on the difference between a desired boil-off rate (i.e., a desired flow rate of the reactant) and the boil-off rate that would occur in ambient conditions without the use of the vapor shield. In other words, it is configured to vary the relative flow rates through the two passageways based on thermal requirements of contents of the storage tank and the needs of the aircraft. It should be noted that the switching device 1) may operate only as an on-on style switch (or two on-off style switches) using a duty cycle that averages out to a desired vapor shield activity rate, 2) may be configured to controllably provide partial flow from both passageways, or 3) may be configured to both controllably provide partial flow and use a duty cycle that averages out to a desired vapor shield activity rate.

In operation, with the boil-off gas flowing through the vapor shield, the heat intake rate of the tank is reduced to about an estimated 60 percent of what it otherwise would have been, assuming a 220K ambient temperature. The heat that would otherwise leak into the tank instead goes to heating the gas flowing through the vapor shield prior to its delivery outside the tank. The corresponding boil-off rate inside the tank will be reduced by the same factor, assuming the tank pressure is held constant. In practice, the tank pressure would likely be allowed to vary over some range, and the relative amounts of time the boil-off gas is passed through the vapor shield is used as a slow control over the tank pressure.

As depicted, the switching device 321 is located outside the fluid storage space, which provides for operation in the ambient conditions. In alternative embodiments, the switching device could be internal to the tank (e.g., at the entrances to the passageways). This may require a more robust switching device able to handle cryogenic temperatures.

The tube portion 303 that forms the surrounding passageways of the vapor shield (of the first set of one or more tubes 301) are further configured with thermally conductive heat spreaders 331 configured to spread the shielding effect of the vapor shield to areas between the surrounding passageways. The heat spreaders are composed of a thermally conductive material, and may be of the same material as the tube portion 303 forming the vapor shield. The heat spreaders are attached to the tube portion along a line substantially along the center of the heat spreaders by a means that provides for a connection with low thermal impedance. A viable method is ultrasonic welding, or a thermally conductive low temperature adhesive.

Thus, the boiled-off hydrogen can be routed optionally through one of two paths: (1) directly away from the tank to the location it is consumed, or (2) through a tube or tubes as part of a vapor shield, which may be embedded within the aerogel insulation. Hydrogen vapor that is routed through the vapor shield results in a reduced heat leak and hence reduces the boil-off rate. By switching between gas paths with a varying duty cycle, the average heat leak into the tank can be continuously varied, allowing the rate of boil off to be matched to the varying fuel consumption requirements of the aircraft without the extensive use of supplemental heaters or fuel bleeding, and the associated wasted energy.

If on occasion the required hydrogen consumption is too high, the pressure might drop in the tank even when controlling the valve for maximum heat leak (i.e., no use of the vapor shield). In this case, a supplemental electric resistance heater (described and shown with reference to FIG. 9) can add the required heat to maintain the desired pressure. At other times, if the hydrogen consumption rate is too low, the pressure may rise in the tank even with all boil-off gas going through the vapor shield. In this case, the excess hydrogen vapor must be vented (and wasted). However, these cases are expected to be unusual, particularly since the amount of insulation on the tank can be exactly tailored to the intended application. It is expected that most hydrogen boil-off rates can be accommodated by controlling the valve duty cycle to modulate the use of the vapor shield. For most tanks and applications, it is expected that the valve-switching period can be large—measured in minutes.

It is within the scope of the invention to have more than one set of tubes that are each separately functional as vapor shields, and that are each separately controllable by the switch 321 and control system 323. Thus, one set of tubes may be configured for cooling one part of the tank, and another set of tubes may be configured for cooling a second part of the tank.

Synergies

The three aspects of the invention have numerous synergies. For example, using the layered and sectioned construction of the first aspect provides for every tank constructed to have a custom designed thermal gradient (under the second aspect of the invention). Every section of every layer could be manufactured in more than one thermal configuration, e.g., it could be constructed with two different thicknesses, or two different aerogel densities. When a particular tank is to be manufactured, a tank designer would first establish an average expected thermal requirement on the tank over the course of a flight plan, and then compare this to anticipated ambient conditions to determine thermal requirements at each different liquid level. Using that information, a level of thermal insulation could be determined for each sectional latitude of the tank, and the thermal qualities of each layer section could be set accordingly. Optionally, the tank designer may be provided with a baseline design, as well as a set of layer sections that may be provided in various thermal conductivities so that the baseline design may be varied at different fluid levels.

Figure 8:
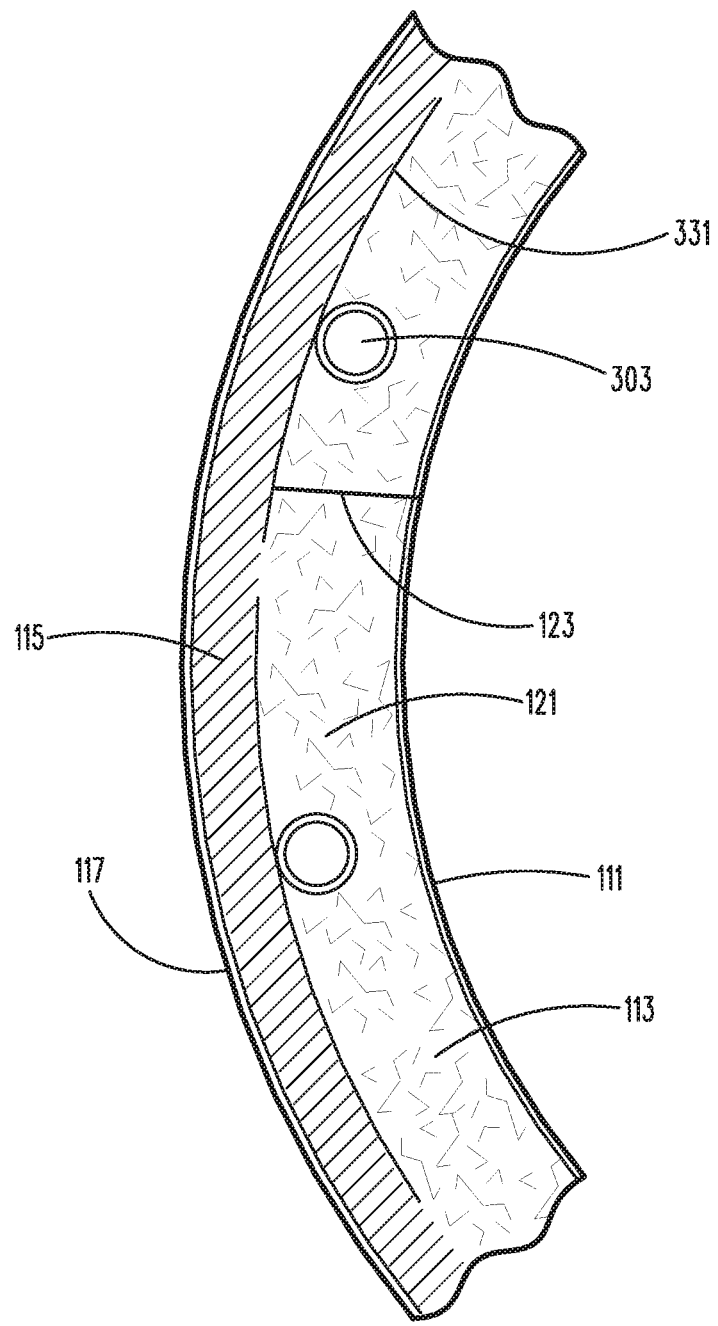
FIG. 8 is a cross-sectional partial view of the vapor shield and tank wall depicted in FIG. 7.

In another synergy, with reference to FIG. 8, the tube portions 303 that form the surrounding passageways of the vapor shield are between the hard shell 111 and flexible vapor barrier 117, and are typically either between the first and second intermediate (aerogel) layers 113 & 115, embedded within an intermediate layer surface that abuts another intermediate layer surface (as depicted), or extending between gaps in a layer that is the same thickness as the tube portions, thereby becoming part of that layer. In the latter of these options, there typically is a third intermediate layer between the first intermediate layer and the second intermediate layer, the third intermediate layer being made of a plurality of third-layer sections and one or more tubes configured to be used as a vapor shield, each third-layer section having a lateral periphery that laterally abuts either the lateral periphery of one or more of the other plurality of third-layer sections or a side of one of the one or more tubes to extend laterally throughout the wall. In any of these options, the tube portions 303 may be run such that the heat spreaders 331 extend across and insulate areas of lower insulation, such as peripheries 123 of the sections 121, and single-point overlaps of the peripheries.

In a third synergy, an embodiment may have more than one set of tubes that are each separately functional as vapor shields, and that are each separately controllable by the switch. For example, one set of tubes may be configured for cooling a gravitational top portion of the tank, and another set of tubes may be configured for cooling a gravitational bottom portion of the tank. Early in the flight, while fuel is in the upper portion of the tank, the upper set of vapor shield tubes may be used to create or augment the varied level of insulation effectiveness of the second aspect of the invention. Both sets of tubes might then be used in conditions when only minimal fuel use is needed, and only the lower set of tubes can be used during later portions of the flight when the fluid level is down to the lower portion and the heat flow through the upper portion becomes unimportant.

As a result of implementing one or more aspects of the invention, the embodiments provide a practical and light weight means of storing liquid hydrogen for aircraft applications. The boil-off hydrogen gas is consumed by the airplane's power system to provide for propulsion and other power loads. Various embodiments may be characterized with combinations of a number of advantages, which may include: 1) a lower weight fraction (expressed as a weight of tank/weight of hydrogen carried); 2) no rigid outer tank may be needed; 3) polished and/or plated tank surfaces may not be required; 4) the rate of hydrogen gas delivery can be controllably modulated over a large range, the size of which is anticipated to be on the order of about 1.7:1, without the use of electric heaters; 5) low fabrication costs; and 6) a highly tailorable design that allows the hydrogen boil-off rate to be designed to a particular specification.

Other Structural Considerations

Figure 9:
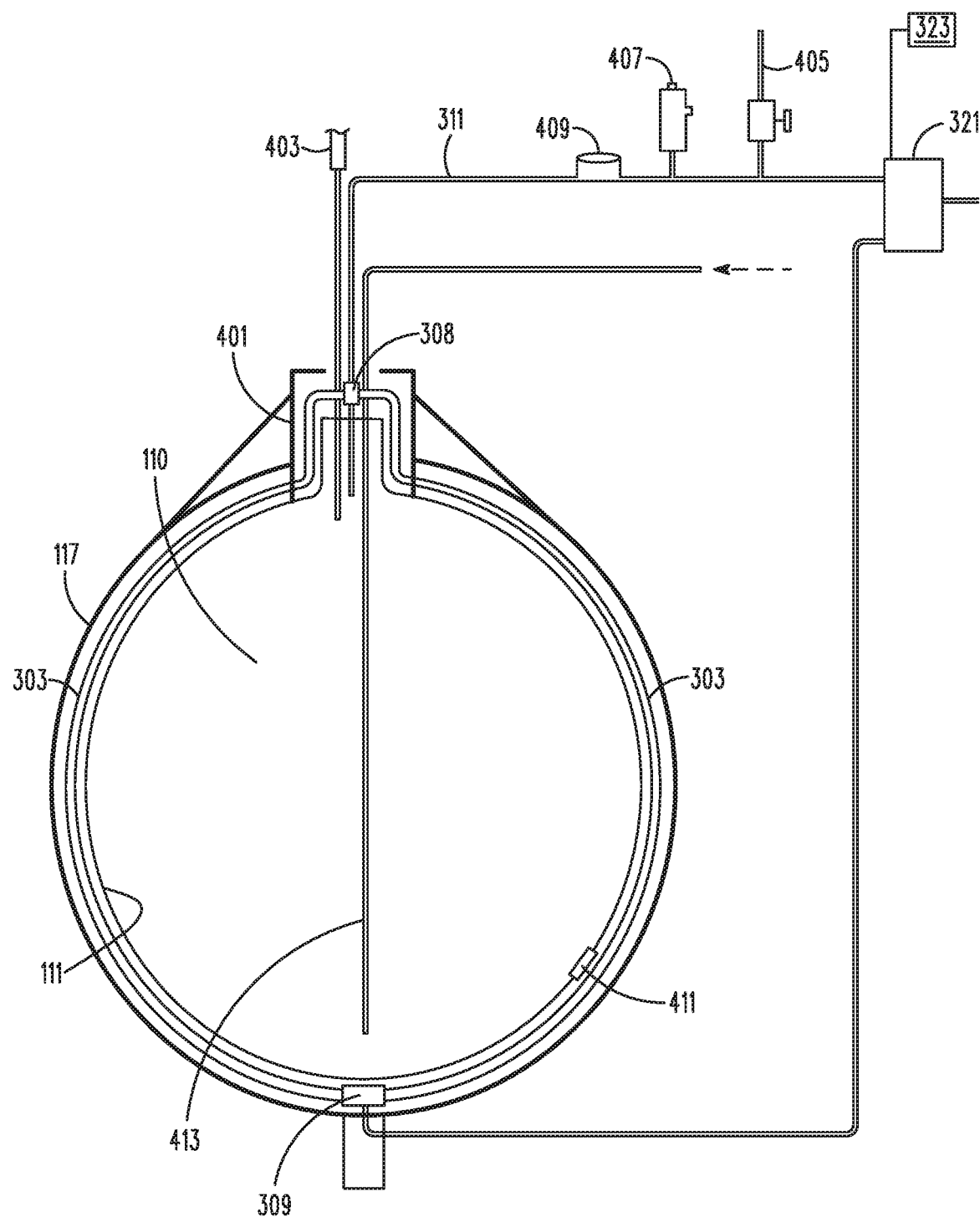
FIG. 9 is a cross-section view of a basic structural layout of the tank depicted in FIG. 1, along with various connections.

With reference to FIG. 9, if the material of the hard shell 111 has isotropic properties, as in a metal (e.g., aluminum or titanium), the anticipated shape of the shell is spherical. Alternate forms of shell, such as one wherein tank sealing is accomplished through a metallic liner, and the pressure loads are carried by an overwrap of unidirectional composite material, may have alternative shapes, such as being a geodesic isotensiod, which is a known shape that provides for a uniform distribution of stress in the overwrapped fibers.

Access to the inner tank 110 is through a neck 401 that is attached to and sealed to the gravitational top of the hard shell 111. The neck is the device by which the inner shell is sealed to the outer vacuum barrier film 117, and it can provide for all connections between the outside and inside of the tank. These connections connect to devices including a liquid filled port 403, a vent 405, the first set of one or more tubes 303 that form the vapor shield, the second set of one or more tubes 311 forming a boil-off gas port that is used to directly provide fuel to the power converter (without forming a vapor shield), a relief valve 407, a burst disk 409, the switch 321, and associated sensors configured to sense tank pressure, liquid level, and the like.

One or more resistance heating elements 411 may be affixed to an outer surface (that is not in contact with the cryogenic liquid) of the hard shell 111, preferably at or near the gravitational bottom of the tank, to provide supplemental heat for increasing the boil-off rate when needed. The control system (323) controls the operation of the heating elements based on the pressure in the tank and/or the fuel needs of the aircraft.

Another, optional means to add supplemental heat to the tank is to return heated hydrogen gas back to the tank. In this variation of the embodiment, hydrogen boil-off gas is heated with waste heat from the power converter and returned to the tank with a small, low-pressure compressor. If the power converter is a fuel cell, the hydrogen going to fuel cell would be heated, so they same heat exchanger that heats the hydrogen can be used to heat the returned hydrogen. The return gas is piped to the bottom of the tank and bubbled up through the remaining liquid using an insertion tube 413, or blown directly onto the liquid surface.

Supplemental open cell foam insulation can be applied externally to the vacuum barrier film to fine tune the overall heat leak. Lightweight open cell foams such as polyamide foams have excellent insulation properties, but are not suitable for cryogenic temperatures. Application of such foams external to the vacuum barrier film typically limits the lowest temperatures seen by the foams to an acceptable level (i.e., high enough to avoid cryopumping). Optionally, these foams may be used to (further) tailor the thermal conductivity of the wall at different fuel heights, as discussed above.

To provide for a functional connection between the vacuum barrier film and the neck, the neck is fabricated from a metal with lower thermal conductivity than that of the hard shell (e.g., the hard shell is an aluminum tank, while the neck is composed of a stainless steel). The connection between these two, dissimilar metals may be made using techniques known in the manufacture of cryogenic tanks. The neck is configured to be thin and long enough to insulate its distal end (i.e., the top end that is farthest from the interior of the tank) such that it is warm enough to accommodate all attachment requirements throughout the ambient conditions that the tank will experience in flight.

The vacuum barrier film 117 is initially in the form of a bag that is slightly larger than the size of the aerogel when it is applied onto the hard shell 111. The bag is fabricated by assembling a number of gores of barrier film together. The attachment of neighboring gores is preferably by means of conventional heat-sealing, as is employed in the fabrication of commercial vacuum insulation panels. The bag is initially assembled from a gravitational bottom of the tank up to a midline, equator portion of the tank. The inner shell and an aerogel insulator is then inserted into this partially completed bag, and the bag is completed by sealing the remaining seams.

The vacuum barrier film 117 bag attaches to the hard shell 111 via the neck 401, at the gravitational top of the tank, in a manner that is vacuum sealed. The vacuum barrier film is a multilayer laminate, typically being one or more layers of metal polyester film and/or polyethylene, such as is typically used in the manufacture of vacuum insulation panels. In the present embodiment, the cold side of the vacuum barrier is the hard shell i.e., the same structure that supports the liquid hydrogen pressure and forms the barrier to hydrogen gas escaping, while the warm side of the vacuum barrier is the vacuum barrier film.

At liquid-hydrogen temperatures, the bag material will typically be brittle and cannot tolerate flexing. The connection between the vacuum barrier film 117 bag and the neck 401 must be configured to avoid damaging the bag when the tank is filled and carried on an aircraft. The surfaces of the panels that form the bag are sealed together with a hand-held heat sealer so as to leave an opening that is essentially the same size as the intended sealing surface on the neck. The portion of the bag that will be bonded to the neck is first coated with a solvent-based adhesive designed for polyolefins such as polyethylene and allowed to dry. This layer acts as a primer. This primered bag surface is then bonded to the neck with room temperature cure epoxy of a type rated for liquid hydrogen temperature. Lose flaps of the bag are glued or taped down in the vicinity of the neck in order to preclude flexing, which could crack the film when the tank is filled and cold. The distance of the stainless steel neck must be long enough to ensure the outer surface to which the bag is bonded is close to ambient temperature. Heaters may be used to ensure the bag to neck transition remains warm. A clamping collar may be used to provide compression to the joint.

Once constructed, the gas/air within the aerogel insulation and in the space between the outer bag and inner shell is pumped out to a pressure of about preferably less than 2.0 Torr. A fitting and tube attached at the neck provides access to the vacuum space. The tube is preferably made of a low conductivity metal such as stainless steel. At the end of the tube a t-junction provides for a vacuum valve for access to the vacuum space, and a vacuum pressure transducer for monitoring the vacuum level. The vacuum level will further increase when the tank is holding liquid hydrogen, as the remaining air freezes out at the wall of the hard shell.

With the aerogel layer in a vacuum and the inner tank still at atmospheric pressure, there will be a small amount of resulting external pressure on the inner shell. This is a result of atmospheric pressure that is applied on the outside of the barrier film. The resulting load is transferred by the aerogel to the inner shell. The apparent external pressure is the product of ambient atmospheric pressure and the square of the ratio of the diameter of the outside of the vacuum barrier to the diameter of the inner shell. If the inner tank is at ambient atmospheric pressure, the result is a net external pressure causing hoop compression. The potential for buckling is mitigated by the stabilizing effect of the aerogel insulation layer being forced against the tank wall under a vacuum. In addition, since for typical designs the insulation is quite thin compared to the diameter of the inner shell, the residual external pressure is quite small—on the order of 2% to 3% of one atmosphere.

The optimum formulation of the aerogel is a function of the tank design parameters. The aerogel will preferably include an opacifier such as carbon black to reduce radiant heat transfer. One specific functional need is that at all altitudes at which the aircraft will be exposed, the aerogel must support the pressure of the atmosphere acting to squeeze the aerogel between the outer vacuum barrier film and the inner shell. Not all aerogels can support this load without substantially crushing.

Aerogels can be produced in varying density. Low density aerogels, if employed in this application, may partially crush under the load increasing the resultant density and degrading the thermal performance. An optimum aerogel for this application is generally one that has the minimum value of the product of conductivity and density while under a one-atmosphere compression load. Minimization of the conductivity-density product leads to the lowest insulation mass (although for different materials of the same conductivity-density product, the one with the highest density/lowest conductivity is preferred because the thickness of the insulation will be minimized). Reducing the insulation thickness has two benefits: reducing the residual compression of the inner shell as discussed above, and reducing the increased heat conduction that is associated with a higher overall diameter. Conductivity varies with temperature, so the optimum material will depend on specific internal and external temperatures for the tank application.

The tank may be supported by a number of different means. In one, the tank is supported at the upper and lower gravitational ends. At the upper end this is done by structural attachment to the neck. At the lower end this is done by attachment to a secondary, bottom neck, which is connected to the bag using techniques similar to the primary (top) neck.

The secondary neck also allows for the vapor shield passageway to exit the wall at an opposite (bottom) side of the tank from the (top) side through which it entered.

This is a preferred method of support by tank manufacturers, and is the method that is intended for use by a flight tank. With this method, the tank hard shell thickness is reinforced at the north (upper gravitational) and south (lower gravitational) poles and is thin around the rest of the tank. There is a also a thickness buildup at the equator where a weld would occur during construction of the hard shell.

In this method of support, vertical, longitudinal, lateral and yawing loads are supported by the north pole fitting. Because the tank may shrink or stretch slightly due to static and thermal loads, only lateral and longitudinal loads are supported by the south pole fitting. This ensures that no compressive loads are introduced into the tank. The north and south pole fittings must be designed to ensure that flight loads may be transferred through the fittings while ensuring that a sufficiently long heat path exists.

In an alternative means of supporting the tank, an annular supporting ring of lightweight material is fabricated with an surface angled to match the external contour of the tank. The diameter of the ring is less than that of the tank, and is chosen to minimize the gravity-induced stresses in the tank (considering the full range of liquid levels). The size of the contact surface area between the ring and the tank is chosen to result in a low average contact pressure that is capable of being supported by the aerogel without excessive compression. A similar annular ring can be located on the top side of the tank to assure that the tank is held securely in place in turbulence or other varying load conditions. The annular rings can be connected to the aircraft structure by any number of conventional structural elements, including tension members, compression members, or beams.

Tank Construction

In the finished tank, the aerogel is effectively held in place by the applied vacuum. In its raw state, the aerogel is usually a powder or beads so a temporary means is needed to apply the aerogel into position until a vacuum is applied.

With reference to FIGS. 2-4 & 10, in a method of construction under the invention, the hard shell 111 is tiled with packaged sections 121 of aerogel using a convenient tiling pattern. The sections are shaped, as described above, to form the first layer. The size of each section tile is set to allow the packaged aerogel sections to be flexed into loose contact with the sphere of the hard shell. Experience has shown that tiles with a maximum dimension of about 10 percent of the tank circumference are practical. As previously discussed, FIG. 4 shows a sample of five tile patterns that will cover a spherical tank with 40 tiles. For a spherical tank, an alternative tile method would be a soccer-ball-like pattern. Other patterns are within the scope of the invention The aerogel tiles are made from sheets of pre-compressed opacified aerogel powder 501 that is cut to an appropriate tile shape and packaged in a porous bag 503 to enable handling. The pressure applied in the precompression stage is sufficient, typically at least one atmosphere, so that the resulting tile will not compress significantly under the vacuum load on the tank. The porous bag is constructed of a heat-shrinkable film and is sealed and trimmed close around the periphery of the tile. The aerogel and method of forming shaped and bagged sections are a commercially known product. Nevertheless, the application of these tiles to the spherical tank as described herein is within the scope of this invention.

The aerogel tiles are assembled to the tank by taping the tiles to adjoining tiles with common plastic film tape 505 (see FIG. 3). The function of the tape is to hold the tiles approximately in place until the vacuum is applied to pull the tiles into tight contact with the tank and each other. Wraps of polyethylene shrink wrap may also be used to hold the tiles in place while the bag is installed.

As previously described, the aerogel insulation is preferably built up in layers. This results in several benefits. First, joints between tiles (sections 121) can be staggered to prevent the inevitable small gaps between tiles from forming an under-insulated heat flow path directly from ambient to the inner shell, as discussed above. Second, adding multiple thinner layers instead of one thicker layer results in individual tiles that are thinner relative to the diameter of the tank, resulting in a more precise fit since there is a smaller difference between the circumferential length of the tile from its outer side to its inner side. Third, an interior layer or layers can be shaped to provide a space for the tube of the vapor shield to be embedded within the layer, as described above. For example, a ¼-in-thick layer could be tiled to leave room for a ¼-in tube as part of the vapor shield.

Figure 11:
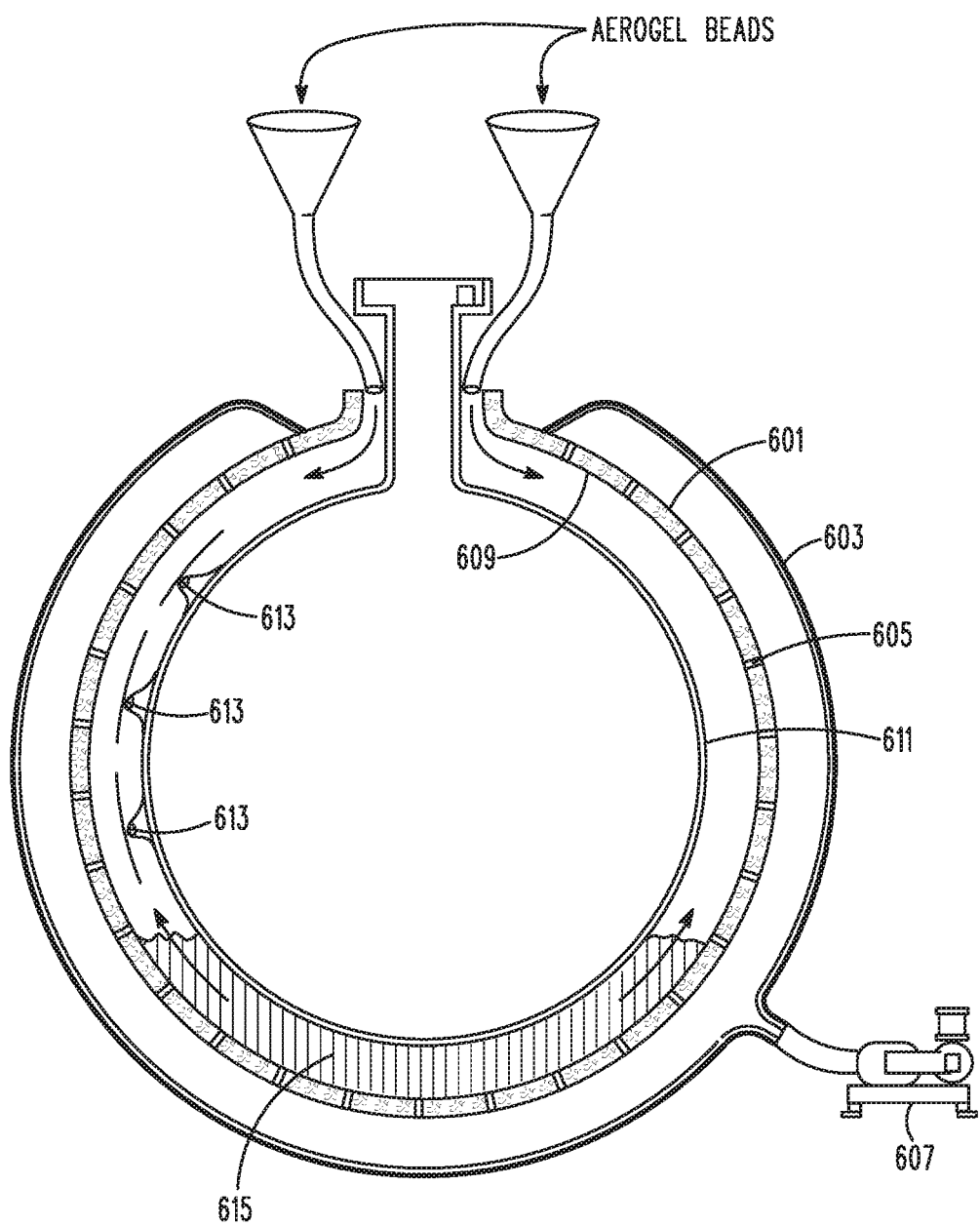
FIG. 11 is an alternative embodiment construction fixture for making a tank under the invention.

With reference to FIG. 11, in an alternative construction method, a means to place powdered or beaded aerogel directly in position without the need for tiling or pre-compressing of the aerogel is used. A fabrication fixture consists of a shell structure 601 whose inner shape is made to be slightly larger than the desired final outside shape of the insulated tank. The fixture is separable along a plane through its center (not shown) to two shell halves to allow access for placement of the hard shell 611. The fixture include a plenum 603 connected through numerous vent holes 605 to the inside surfaces of the shell halves. The plenum is connected to a source of vacuum 607.

For assembly, the vacuum barrier film bag 609 is first assembled loosely over the hard shell 611 and vapor shield 613, with the mouth of the bag left unattached to the neck of the tank. The bag and hard shell/vapor shield are installed into the fixture and supported from the neck at the top such as to be centered within the cavity formed by the space between the hard shell 611 and the shell structure 601. The vapor shield 613 and its tubing are supported in place by several small spacers to the inner shell. The mouth of the bag is then temporarily attached and sealed to the shell structure 601 and a vacuum is applied via the plenum 603 to the space between the bag and the inside surface of the shell structure 601. The barrier film bag is thus pulled uniformly outwards into contact with the shell structure 601, as depicted. The bag is fashioned to be slightly smaller in diameter than the inner diameter of the shell structure.

The vacuum stretches the bag 609 slightly as it is pulled against the wall of the shell structure 601 to assure that there are no wrinkles on the inside surface of the bag. An annular gap now exists between the neck of the tank and mouth of the bag (which is temporarily sealed against the shell structure. Aerogel powder or beads 615 are now added through this annular gap until the space is completely filled. The fixture can be vibrated, struck with a dead blow hammer, or rocked in order to promote even filling of the space without voids. After all the aerogel has been added the light vacuum is released from the shell structure 601 and the mouth of the bag is detached from the fixture and permanently sealed to the mouth of the tank with a suitable adhesive. A vacuum is now applied as described above. Getters (I.e., reactive materials used for removing traces of gas from vacuum systems) can be added into the insulation layer to maintain the vacuum at the desired level.

It is to be understood that the invention comprises apparatus and methods for designing tanks, and for producing tanks, as well as the apparatus and methods of the tank itself. Additionally, the various embodiments of the invention can incorporate various combinations of the above-described features. Moreover, it is contemplated that the claims are broader than the described embodiments.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A storage tank, comprising:
   an inner-most layer that defines and substantially surrounds a fluid storage space;
   a first set of one or more tubes configured to be used as a vapor shield around at least a portion of the inner-most layer, the first set of one or more tubes being adapted as a first passageway extending from within the fluid storage space to outside of the fluid storage space;
   a second set of one or more tubes adapted as a second passageway extending from within the fluid storage space to outside of the fluid storage space; and
   a switching device configured to control the relative flow rates from the first and second passageways.

2. The storage tank of claim 1, wherein the switching device is located outside the fluid storage space.

3. The storage tank of claim 1, wherein the second passageway is a direct exit that is not adapted to function as a vapor shield.

4. The storage tank of claim 1, and further comprising a controller configured to vary the relative flow rates based on pressure requirements of the storage tank.

5. The storage tank of claim 1, wherein the tank is configured to store a fluid as a cryogenic liquid, and further comprising a controller configured to vary the relative flow rates based on a desired flow rate of fluid vapor.

* * * * *